US009013960B2

(12) United States Patent
Wulff et al.

(10) Patent No.: US 9,013,960 B2
(45) Date of Patent: Apr. 21, 2015

(54) ORIENTATION OF AN ULTRASONIC SIGNAL

(75) Inventors: Thomas E. Wulff, North Patchogue, NY (US); Russell E. Calvarese, Stony Brook, NY (US); Richard J. Lavery, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 477 days.

(21) Appl. No.: 13/452,369

(22) Filed: Apr. 20, 2012

(65) Prior Publication Data

US 2013/0279297 A1    Oct. 24, 2013

(51) Int. Cl.
| | |
|---|---|
| *G01S 3/80* | (2006.01) |
| *G01S 15/00* | (2006.01) |
| *G10K 11/34* | (2006.01) |
| *G01S 3/801* | (2006.01) |

(52) U.S. Cl.
CPC ............... *G01S 15/00* (2013.01); *G01S 3/801* (2013.01); *G10K 11/346* (2013.01)

(58) Field of Classification Search
CPC ........................................... G01S 3/801
USPC .................................. 367/119, 127
See application file for complete search history.

(56) References Cited

U.S. PATENT DOCUMENTS

| | | | | |
|---|---|---|---|---|
| 5,319,611 | A | | 6/1994 | Korba |
| 6,108,275 | A | * | 8/2000 | Hughes et al. ............... 367/164 |
| 6,363,139 | B1 | | 3/2002 | Zurek et al. |
| 6,710,719 | B1 | * | 3/2004 | Jones et al. .................... 340/8.1 |
| 6,798,716 | B1 | * | 9/2004 | Charych ....................... 367/119 |
| 6,826,117 | B2 | | 11/2004 | Haase et al. |
| 6,970,097 | B2 | | 11/2005 | Welles, II et al. |
| 7,388,810 | B2 | | 6/2008 | Campbell |
| 7,415,881 | B2 | | 8/2008 | Haque et al. |
| 7,668,046 | B2 | | 2/2010 | Banker et al. |
| 7,775,884 | B1 | | 8/2010 | McCauley |
| 7,796,471 | B2 | * | 9/2010 | Guigne et al. ................ 367/128 |
| 7,916,577 | B2 | | 3/2011 | Jeong et al. |
| 8,054,203 | B2 | | 11/2011 | Breed et al. |

(Continued)

FOREIGN PATENT DOCUMENTS

| | | |
|---|---|---|
| JP | S59210387 A | 11/1984 |
| JP | 2007187680 A | 7/2007 |

(Continued)

OTHER PUBLICATIONS

International Search Report and Written Opinion for International Patent Application No. PCT/US2013/032934 mailed May 28, 2013.

*Primary Examiner* — Mark Hellner

(57) ABSTRACT

A system and method for orientation of an ultrasonic signal includes at least two emitters in a mobile device that includes an orientation sensor that can determine a device orientation. A receiver at a fixed, known point includes at least two microphones operable to receive an ultrasonic signal from the device. The mobile device can drive the emitters to produce an ultrasonic signal that is oriented towards the receiver. A location engine can establish a location of the mobile device using the time delay of arrival of an ultrasonic burst from the mobile device impinging on each microphone of the receiver. In response to the location and/or the orientation, the mobile device operable to drive the emitters to produce a signal that is oriented towards the receiver.

12 Claims, 2 Drawing Sheets

(56) References Cited

U.S. PATENT DOCUMENTS

2002/0023497 A1 2/2002 Hayashi et al.
2013/0040655 A1* 2/2013 Keidar .................. 455/456.1

FOREIGN PATENT DOCUMENTS

| JP | 2008051657 | 3/2008 |
|---|---|---|
| JP | 2010009542 | 1/2010 |

* cited by examiner

ORIENTATION OF AN ULTRASONIC SIGNAL

FIELD OF THE DISCLOSURE

The present disclosure relates generally to an ultrasonic signaling system, and more particularly to orienting an ultrasonic signal within an environment.

BACKGROUND

An ultrasonic receiver can be used to determine the location of items that contain ultrasonic emitters, such as a mobile device present within a retail, factory, or warehouse environment, for example. The ultrasonic emitters can transmit ultrasonic energy in a short burst which can be received by an ultrasonic transducer (microphone) in the ultrasonic receiver, thereby establishing the presence of the device within the environment. The ultrasonic emitters can also transmit information to the receiver in an ultrasonic signal for data communication.

Further, the use of several ultrasonic microphones distributed within the environment can also be used to provide a specific location of a particular mobile device using techniques known in the art such as triangulation, trilateration, and the like. However, unlike radio frequency locationing systems, ultrasonic locationing systems suffer from particular problems related to the character of ultrasonic sound waves and their environment of use. Firstly, ultrasonic signals are easily subject to noise. Secondly, ultrasonic waves are typically subject to acoustic reverberation due to multipath reflections. Therefore, signals sent by emitters can be interfered with by reverberations. This problem is compounded when there are multiple emitters that are emitting a signal.

Accordingly, there is a need for an improved technique to resolve the above issues within an ultrasonic locationing system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
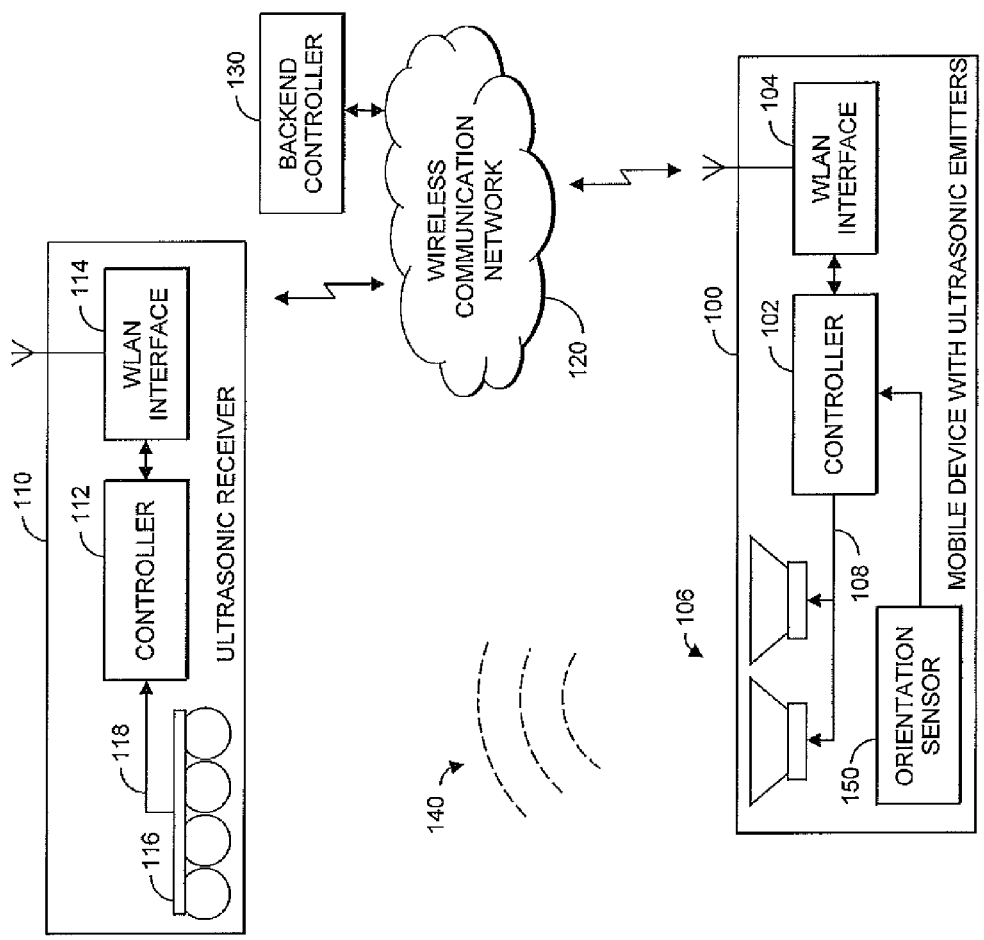
FIG. 1 is a simplified block diagram of an ultrasonic signaling system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to resolve the issues with ultrasonic signaling and reception within an environment. In particular, the present invention directs an orientation of ultrasonic signals impinging on microphones of a receiver to reduce noise and reverberations. Specifically, the present invention will determine a location and/or orientation of an ultrasonic transmitting device and, using the known location of the ultrasonic receiver relative to the ultrasonic transmitter, drive only that device emitter (and receiver microphone) that are best aligned with each other. This can be done using ultrasonic beam steering or simply by driving only the emitter in a mobile device that is most oriented towards the receiver. Similarly, the present invention could only activate the microphone in the receiver that is most oriented towards the mobile device. In an environment installed with multiple receiver assemblies, the present invention could only activate the receiver assembly that is most closely positioned near the mobile device. As a result, the present invention provides less multipath reverberations and reflections than when driving all emitters (and microphones) and thereby increases the likelihood of a successful communication. In addition, the present invention decreases noise and power consumption.

The device incorporating the emitters can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, and the like, all referred to herein as a device. Each device comprises a processor that can be further coupled to a keypad, a speaker, a microphone, a display, signal processors, and other features, as are known in the art and therefore not shown.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ ports, and wireless clients can all include separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic signal orientation system, in accordance with the present invention. At least two ultrasonic transponders such as a piezoelectric speaker or emitter 106 can be implemented within a mobile device 100. The emitters can send a short burst of ultrasonic sound (e.g. 140) to indicate the presence of the mobile device 100 within an environment of the system. The mobile device can include a controller 102 to provide the signal 108 to be transmitted by the emitters 106. The mobile device also includes an orientation sensor 150 that can be used by the controller 102 to determine an orientation of the mobile device, and thereby the orientation of the emitters of the device. The orientation sensor can be any one or more of an accelerometer, a magnetometer, gravity gradiometers, a gyroscope, and the like, as are known in the art. The controller 102 can also be coupled to a wireless local area network interface 104 for wireless communication with other entities in the communication network 120.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

An ultrasonic receiver 110 includes a transducer such as one or more ultrasonic microphone 116 that can respond to the ultrasonic signal 140 transmitted from the ultrasonic emitter(s) 106 of the mobile device. Each microphone 116 provides electrical signals 118 to a receiver circuitry including signal processors (not shown) and a controller 112, such that the receiver controller will be aware of the presence of a device incorporating that ultrasonic emitter within the environment. The receiver controller can also receive ultrasonic data communications from the device, as well as, derive location information of the transmitting device relative to the ultrasonic receiver 110. In the embodiment described herein, the emitter(s) of mobile device can emit an ultrasonic signal at 40.3 kHz in one 300 µs ultrasonic burst, although it should be realized that other ultrasonic frequencies, timing and data signaling could be used. The emission may be accomplished by the controller 102 driving one emitter or by the controller driving two emitters at different phases in order to beam steer the ultrasonic signal. The receiver controller 112 can also be coupled to a wireless local area network interface 114 for wireless communication with other entities in the communication network 120. Alternatively, the controller 112 could be connected to the communication network 120 through a wired interface connection (not shown), such as an Ethernet interface connection.

In order to provide positioning ability, the transducer of the receiver includes a plurality of microphones 116 able to discriminate between different arrival times of a particular ultrasonic signal from a mobile device. In one embodiment, there are four microphones 116 integrated within a single receiver 110 housing. In this embodiment, three of the microphones can be disposed at each apex of a substantially triangular configuration, such as in a substantially flat triangular housing, and are configured in an array, and where the fourth microphone is disposed in the middle of the triangular configuration, substantially coplanar with the other microphones. For unobtrusiveness and clear signaling, the housing can be affixed to a ceiling of the environment, where the position of each microphone is known and fixed. Of course, it should be recognized than many different housing and microphone configurations could be utilized with any number of microphones. However, the embodiment described herein utilizes relatively closely-spaced microphones within a singular housing.

As the location and position of these microphones 116 is known and fixed, multilateration or trilateration of a signal (e.g. an ultrasonic burst 140) received by these microphones can used to locate and track the position of an emitter device using a time delay of arrival (TDOA) at each microphone. It should be recognized that any suitable locationing technique can be used in a location engine to determine a location of the mobile device. Such location engine can be incorporated into a controller 102 of the mobile device, a controller 112 of the receiver, or any other controller or processor such as backend controller 130 of the wireless network 120.

Locationing accuracy can be improved by knowing the emitting time and receiving time of the ultrasonic signal. For example, the backend controller could include the location engine and could direct exactly when the mobile device activates its emitters. In this case, the backend controller knows when the ultrasonic signal was sent, and can then determine the flight time of the signal by subtracting the emitting time from the acknowledgment of the reception time from the receiver, i.e. RF synchronization/clock synchronization.

Alternatively, the location engine can be in the receiver. In this case, the backend controller could radio the time of the originating ultrasonic signal to the receiver which would allow the receiver to convert TDOA values into flight times allowing trilateration, which has accuracy advantages over multilateration is some cases. Flight time can also be calculated once the position is determined by multilateration by simply taking the square root of the sum of the squares of the emitter's relative position in three dimensional space of the environment and then dividing by the speed of sound. It should be noted that the radio frequency communications are relatively instantaneous next to the flight time of the ultrasonic signal and could be ignored. Using a locationing technique such as multilateration, along with the flight time, the receiver 110 could determine and inform the backend controller of the location of the mobile device, which the backend controller can use to track its location during subsequent bursts.

In yet another alternative, the location engine can be in the mobile device. In this case, the backend controller could radio the reception time and TDOA values of the received ultrasonic signal from the receiver back to the mobile device, which would allow the mobile device to convert the TDOA values into flight times allowing trilateration or multilateration as described above. Using a locationing technique such as multilateration, along with the flight time, the mobile device could determine its location with respect to the receiver so that can determine how to orient its emitter signal.

In one embodiment, only the orientation sensor is needed by the mobile device to determine how to orient its ultrasonic signal, and it is not necessary to known the location of the mobile device within the environment. In this embodiment, the mobile device includes at least two emitters operable to emit the ultrasonic signal. The mobile device also includes the orientation sensor operable to determine an orientation of the mobile device, and in particular a gravity vector in the mobile device. In this embodiment, it is known that the receiver is mounted at a fixed point on a ceiling of the environment and the mobile device is used on a floor of the environment.

Therefore, the preferred direction to orient the ultrasonic signal is generally upwards from the floor (mobile device) towards the ceiling (receiver). In particular, the orientation sensor is operable to determine a gravity vector in the mobile device, and the preferred direction is opposite the pull of gravity. Therefore, the mobile device (knowing its orientation and the orientation of its emitters disposed therein) can direct the ultrasonic signal to be emitted upwardly by either driving only the most upwardly facing emitter or by driving the emitters in a phased array to beam steer the ultrasonic signal upwardly.

Alternatively, if the location of the receiver is known, the optimal pointing position might not be opposite the gravity vector. Depending on where the receiver is located the optimal transducer might be the one oriented some number of degrees away from the gravity vector. More particularly, if it is known that the receiver located at a fixed, known point in an environment of the system, and a specific location of the mobile device can be determined, then the aiming of the ultrasonic signal can be better oriented between the mobile device and the receiver. Therefore, in a further embodiment, a location engine (as described previously) is used to establish a location of the mobile device within the environment of the system, wherein, in response to both the location and the orientation, the mobile device can better drive the emitters to orient the ultrasonic signal towards the receiver. In particular, a location of the mobile device within the environment can be determined first, and then the ultrasonic signal can be oriented from the mobile device to the receiver. Specifically, the mobile device could first emit an ultrasonic burst to the receiver, such that the location engine can determine a location of the mobile device within the environment, and then the mobile device can drive its emitters to orient a subsequent ultrasonic signal towards the receiver enabling the best performance and lowest noise solution.

As described previously, the time delay of arrival of the ultrasonic burst from the mobile device impinging on each microphone is utilized by the location engine to determine a location of the mobile device. The location engine can then use a triangulation, trilateration, or multilateration locationing technique to determine a location of the mobile device. If the location engine is not present within the mobile device (i.e. it is located in the receiver or backend controller), the information about the location of the mobile device can be radioed to the mobile device so that the mobile device will know how to orient its ultrasonic signal. Afterwards subsequent ultrasonic signaling or burst could be used to track the location of the mobile device.

As described previously, the emitters are oriented in different directions in the mobile device, and the mobile device can be operated to drive only one of the emitters that is most oriented towards the receiver. Alternatively, the emitters can be oriented in a phased array in the mobile device, such that the mobile device can drive each emitter with a different phase of the driving electrical signal in order to beam steer the ultrasonic signal towards the receiver.

In any of the above embodiments, the microphones disposed in the receiver can oriented in different directions, such that the receiver could operate only one of the microphones that is most oriented towards the mobile device. This would lower the possibility of other microphones picking up reverberations or reflections.

Figure 2:
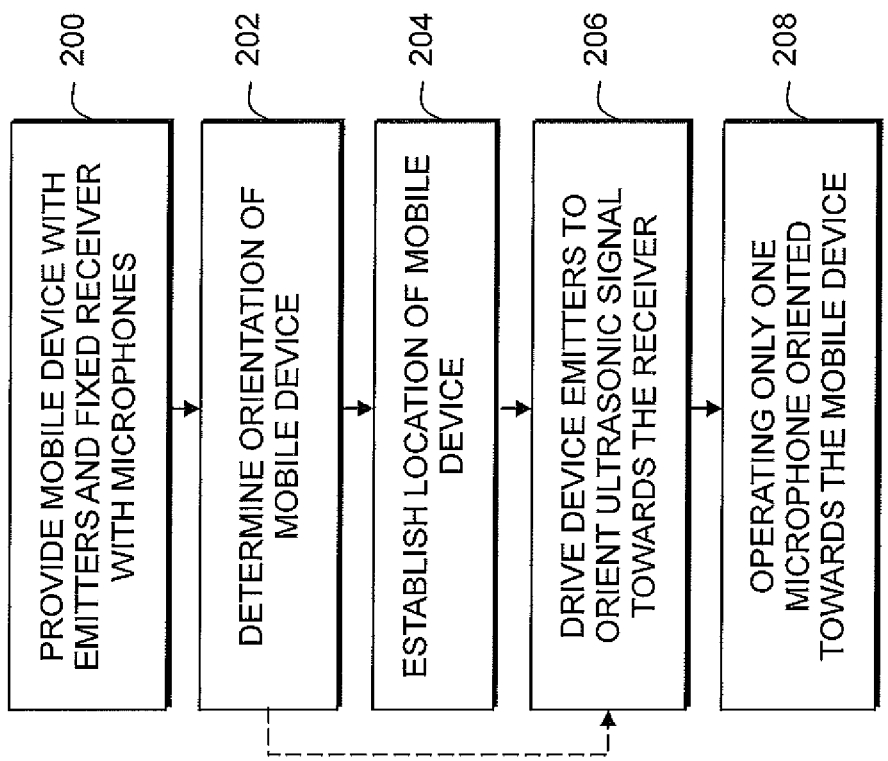
FIG. 2 is a flow diagram illustrating a method for ultrasonic signaling, in accordance with some embodiments of the present invention.

FIG. 2 is a diagram illustrating a method for orientation of an ultrasonic signal within an environment, according to some embodiments of the present invention.

A first step 200 includes providing a mobile device including at least two emitters operable to emit an ultrasonic signal and a receiver located at a fixed, known point in an environment of the system with at least two microphones operable to receive the ultrasonic signal.

A next step 202 includes determining an orientation of the mobile device.

An optional next step 204 includes establishing a location of the mobile device within the environment of the system.

A next step 206 includes, in response to the location and/or the orientation, driving the emitters to orient the ultrasonic signal towards the receiver. This can include driving only one of the emitters that is most oriented towards the receiver, where the emitters are oriented in different directions in the mobile device. Alternatively, this can also include driving each emitter with its own phase shift to beam steer the ultrasonic signal towards the receiver, where the emitters are oriented in a phased array in the mobile device.

An optional step 208 includes operating only one of the microphones that is most oriented towards the mobile device, where the microphones are oriented in different directions in the receiver.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for orientation of an ultrasonic signal, comprising:
   a mobile device including at least two emitters operable to emit an ultrasonic signal, the mobile device also including an orientation sensor operable to determine an orientation of the mobile device;
   in response to the orientation, the mobile device operable to drive the emitters to orient the ultrasonic signal in a preferred direction;
   a receiver with at least two microphones operable to receive the ultrasonic signal, the receiver located at a fixed, known point in an environment of the system; and
   a location engine operable to establish a location of the mobile device within the environment of the system; and wherein
   in response to the location and the orientation, the mobile device operable to drive the emitters to orient the ultrasonic signal towards the receiver.

2. The system of claim 1, wherein the mobile device is operable to emit an ultrasonic burst to the receiver, such that the location engine can determine a location of the mobile device within the environment.

3. The system of claim 2, wherein the time delay of arrival of the ultrasonic burst from the mobile device impinging on each microphone is utilized by the location engine to determine a location of the mobile device.

4. The system of claim 3, wherein the location engine is operable to use a multilateration locationing technique to determine and track a location of the mobile device.

5. The system of claim 1, wherein the emitters are oriented in different directions in the mobile device, and wherein the mobile device is operable to drive only one of the emitters that is most oriented towards the receiver.

6. The system of claim 1, wherein the emitters are oriented in a phased array in the mobile device, and wherein the mobile device is operable to drive the emitters to beam steer the ultrasonic signal towards the receiver.

7. The system of claim 1, wherein the microphones are oriented in different directions in the receiver, and wherein the receiver is operable to operate only one of the microphones that is most oriented towards the mobile device.

8. The system of claim 1, further comprising multiple receiver assemblies, each with at least two microphones operable to receive the ultrasonic signal, the receiver assemblies located at a fixed, known points in an environment of the system, and wherein the receiver assembly that is most closely positioned near the mobile device is the only assembly activated.

9. A system for orientation of an ultrasonic signal, comprising:
   a mobile device including at least two emitters operable to emit an ultrasonic signal, wherein the emitters are oriented in different directions in the mobile device, the mobile device also including an orientation sensor operable to determine an orientation of the mobile device;
   a receiver with at least two microphones operable to receive the ultrasonic signal, the receiver located at a fixed, known point in an environment of the system;
   a location engine operable to establish a location of the mobile device within the environment of the system; wherein
   in response to the location and the orientation, the mobile device operable to drive only one of the emitters that is most oriented towards the receiver.

10. A method for orientation of an ultrasonic signal, comprising:
    providing a mobile device including at least two emitters operable to emit an ultrasonic signal and a receiver with at least two microphones operable to receive the ultrasonic signal, the receiver located at a fixed, known point in an environment of the system;
    determining an orientation of the mobile device;
    establishing a location of the mobile device within the environment of the system; and
    in response to the location and the orientation, driving the emitters to orient the ultrasonic signal towards the receiver.

11. The method of claim 10, wherein driving includes driving only one of the emitters that is most oriented towards the receiver, where the emitters are oriented in different directions in the mobile device.

12. The method of claim 10, further comprising operating only one of the microphones that is most oriented towards the mobile device, where the microphones are oriented in different directions in the receiver.

* * * * *